United States Patent
Joseph

(10) Patent No.: US 7,289,988 B2
(45) Date of Patent: Oct. 30, 2007

(54) METHOD AND SYSTEM FOR MANAGING EVENTS

(75) Inventor: Anish Pulikottil Joseph, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 10/614,060

(22) Filed: Jul. 8, 2003

(65) Prior Publication Data

US 2005/0010545 A1    Jan. 13, 2005

(51) Int. Cl.
  *G06F 17/30* (2006.01)
(52) U.S. Cl. ............... 707/6; 707/9; 707/10; 707/100; 707/101; 700/224
(58) Field of Classification Search ............... 707/6, 707/9, 10, 100–101; 709/224
  See application file for complete search history.

(56) References Cited

U.S. PATENT DOCUMENTS

| | | | |
|---|---|---|---|
| 5,844,808 A * | 12/1998 | Konsmo et al. ............. | 700/244 |
| 6,832,341 B1 * | 12/2004 | Vijayan ........................ | 714/43 |
| 6,920,468 B1 * | 7/2005 | Cousins et al. .............. | 707/203 |
| 7,003,781 B1 * | 2/2006 | Blackwell et al. .......... | 719/327 |
| 2002/0083168 A1 * | 6/2002 | Sweeney et al. ............ | 709/224 |
| 2002/0178045 A1 * | 11/2002 | Kraft et al. ................... | 705/10 |
| 2003/0046582 A1 * | 3/2003 | Black et al. ................. | 713/201 |
| 2004/0117407 A1 * | 6/2004 | Kumar et al. ............... | 707/200 |
| 2004/0128295 A1 * | 7/2004 | Adi et al. .................... | 707/100 |
| 2004/0181685 A1 * | 9/2004 | Marwaha ..................... | 713/201 |

\* cited by examiner

*Primary Examiner*—Khanh B. Pham

(57) ABSTRACT

A method for managing events. A first event 16 is received by an event engine from one of a multitude of sources. A rule which matches the event is extracted from a database 31. When the rule specifies that the event is to be held the event engine holds 22 the event for a specified time. Certain events received during that time are caught by the engine. At the expiration of the time a new event relating to the first event and captured events is created 24. The new event is fed-back 30 into the engine. Other methods for managing events wherein the event is held by an event engine and new events are fed-back into the event engine are disclosed. Systems for implementing the methods are further disclosed.

21 Claims, 8 Drawing Sheets

METHOD AND SYSTEM FOR MANAGING EVENTS

FIELD OF INVENTION

The present invention relates to a method and system for managing events. More particularly, but not exclusively, the present invention relates to a method and system for correlating generic events from a multitude of sources.

BACKGROUND TO THE INVENTION

In the world of e-business, time is collapsing as business processes involving consumers, partners, suppliers and employees operate in real-time across high-speed intranets and the Internet. Business success relies upon highly available systems and the customers' Internet experience. IT managers and CIOs are faced with constantly changing technology, ever-increasing pressures to deliver, a shortage of necessary people and skills, and the ongoing difficulty in achieving alignment between IT management and overall business objectives.

What is required is a distributed large-scale management solution that can monitor, control and report the health of the IT environment across boundaries.

On the distributed systems of the present there are implemented numerous, often disparate, hardware and software solutions. These implemented solutions generate large numbers of events, including: errors, status messages, performance variables, and customer variables. For example applications can create log files, database systems can generate error or status messages, operating systems can generate messages, MICROSOFT™ WINDOWS™ can generate event logs and performance monitors, and networks can generate SNMP (Simple Network Management Protocol) events.

In order to assist the management of these systems what is desired is a system for coordinating and consolidating the multitude of events from across the distributed systems.

To address the problem of managing large numbers of events from different sources two approaches have been taken:

1) Event flow model. The event flow model while very flexible tends to become very complex to implement and requires the end user to learn a language and to also have design skills.
2) A rules engine. The rules engine also requires learning of a language and structurally becomes tremendously complicated when describing complex rules.

It is an object of the present invention to provide a method and system for managing events from a multitude of sources which overcomes the disadvantages of the above prior art and meets the requirements of real world distributed systems, or at least provides the public with a useful choice.

SUMMARY OF THE INVENTION

According to the first aspect of the invention there is provided a method of managing events in an event engine including the steps of:
i. inputting an event into the engine;
ii. the engine extracting a rule from a rules database wherein identification information within the rule identifies the event;
iii. the engine holding the event for the expiration of a specified interval;
iv. before the expiration of the specified interval inputting a further event into the engine;
v. the engine identifying the further event using identification information within the rule;
vi. the engine creating and outputting a new event;
vii. inputting the new event into the engine: and
viii. the engine extracting a second rule from a rules database wherein identification information within the second rule identifies the new event.

The source of the event and the further event may be a network, an application, an operating system, or hardware. Preferably, intelligent agents collect the events originating from the source and transmit them on to the engine. In a preferred embodiment of the method the intelligent agents convert the events collected from the source into a common format before transmitting them on to the engine.

The identification information may include an attribute, an operator, and a value.

Preferably, the specified interval is time.

According to a further aspect of the invention there is provided a method of managing events in an event engine including the steps of:
i. inputting an event into the engine;
ii. the engine extracting a rule from a rules database wherein identification information within the rule identifies the event;
iii. the engine creating and outputting a new event;
iv. inputting the new event into the engine;
v. the engine extracting a second rule from the rules database wherein identification information within the second rule identifies the new event;
vi. the engine holding the new event for the expiration of a specified interval;
vii. before the expiration of the specified interval inputting a further event into the engine;
viii. the engine identifying the further event using identification information within the second rule; and
ix. the engine creating and outputting a further new event.

Preferably, the outputted further new event is received by a user console.

According to a further aspect of the invention there is provided a method of managing events in an event engine including the steps of:
i. inputting an event into the engine
ii. the engine extracting a first rule from a rules database wherein identification information within the first rule identifies the event;
iii. the engine holding the event for the expiration of a specified interval;
iv. before the expiration of the specified interval inputting a further event into the event engine;
v. the engine extracting a second rule from the rules database wherein identification information within the second rule identifies the further event;
vi. the engine creating and outputting a new event;
vii. before the expiration of the specified interval inputting the new event into the engine;
viii. the engine identifying the new event using identification information within the first rule; and
ix. the engine creating and outputting a further new event.

According to a further aspect of the invention there is provided a method of managing events including the steps of:
i. receiving an event;
ii. extracting a rule from a rules database wherein identification information within the rule identifies the event;

iii. when specified within the rule performing one of:
   a) creating a new event; or
   b) holding the event;
      wherein during the method at least one rule specifies performance of step a) and at least one rule specifies performance of step b); and
iv. repeating steps i. to iii. at least once;
   wherein at least one received event in step i. is a new event created in step iii. a).

According to a further aspect of the invention there is provided a method of generating an event in an event engine based upon two or more received events and an event previously generated by the event engine wherein at least one of the events is held by the event engine until the expiration of a specified interval.

According to a further aspect of the invention there is provided a method of managing events including the steps of:
i. processing an event by:
   a) receiving the event;
   b) extracting one or more rules which match the event from a rules database;
   c) discarding the event if at least one of the rules specifies that the event is to be discarded;
   d) holding the event if at least one of the rules specifies that the event is to be held for a period of time;
   e) altering the event or creating a new event if at least one of the rules specifies that the event is to be altered or a new event created; and
   f) outputting the event if all rules specify that the event is to be outputted;
   wherein if the event is discarded then neither of steps (d) and (e) will proceed;
ii. holding the event for the longest period of time specified by the rules if the event is specified to be held; and
iii. repeating step (i) if the event was held in step (ii).

According to a further aspect of the invention there is provided a system for managing events including:
i. a plurality of event agents adapted to receive data from a source, to create an event from the data and to transmit the event to a central event system; and
ii. a central event system including:
   a) a rules database adapted to store a plurality of rules, each rule including:
      I. identification information specifying to which events the rule relates; and
      II. an action wherein the action is one of outputting the event, discarding the event, holding the event, or creating a new event;
      wherein, where the action is holding the event the rule further includes:
      I. a condition; and
      II. a further action wherein the further action is one of outputting the event, discarding the event, holding the event, creating a new event, or creating a new event and transmitting the new event back into the processing engine; and
   b) a processing engine adapted to receive events, to extract rules from the rules database, to identify which rules apply to the events using the identification information within the rule, to perform the action specified within the applicable rules, and to perform the further action specified within the applicable rules when the corresponding condition is satisfied.

Preferably the system also includes one or more user consoles which are adapted to receive events outputted by the central event system.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

Figure 1:
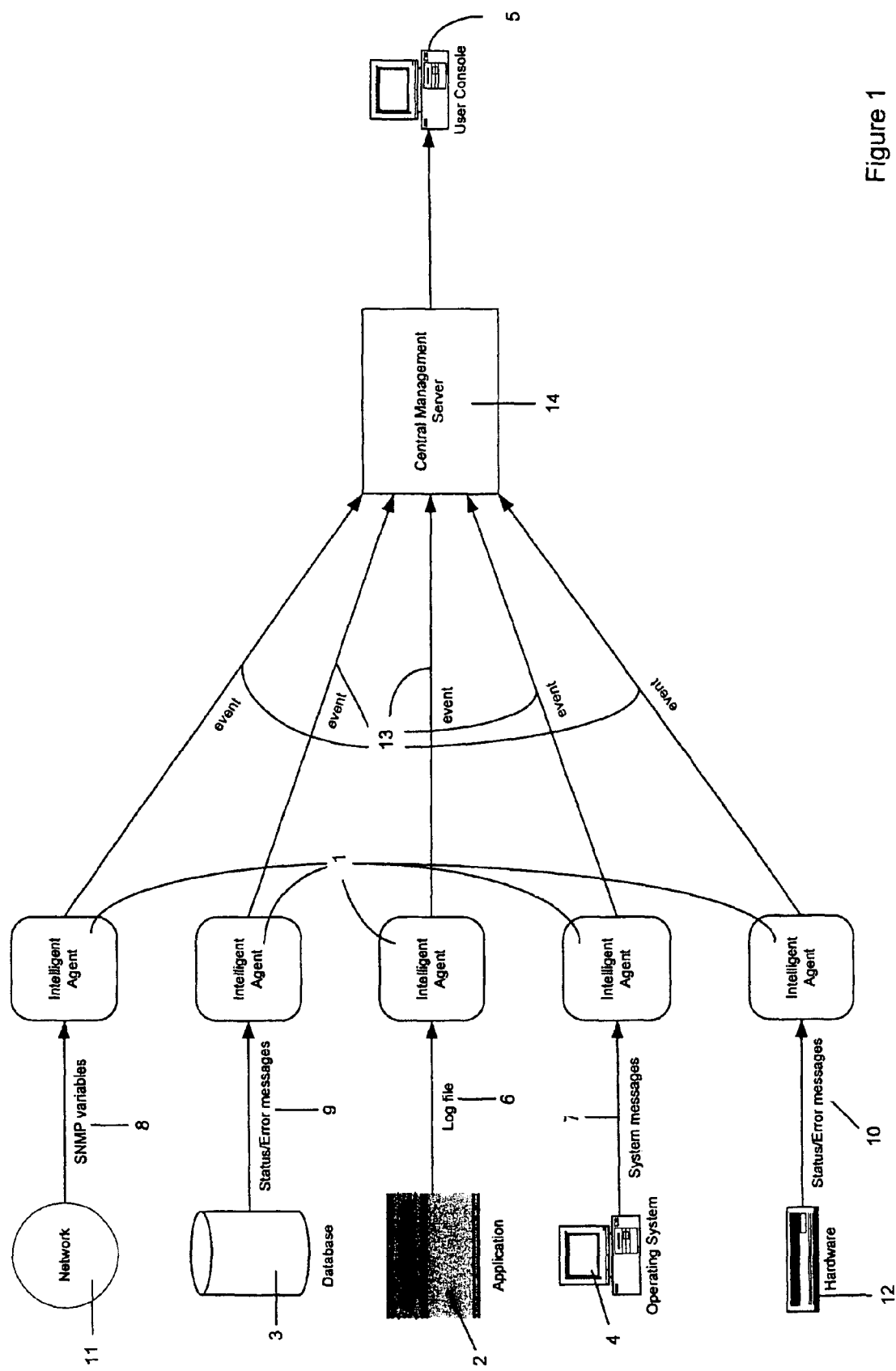
FIG. 1: illustrates the system.

The invention will be described in relation to FIG. 1.

The invention can provide a single-pane-of-glass view for close and efficient control of events happening across all systems, creating a "mission control" centre for an entire distributed environment. It monitors, filters, correlates and responds to the thousands of events that occur daily from network devices, systems, databases and applications.

Fully integrated operations and performance agents 1 (intelligent agents) provide functionality to efficiently monitor the health and performance of virtually any system.

The invention is capable of managing industry leading applications 2, databases 3, and every major operating system 4, including HP-UX, Sun Solaris, Microsoft Windows®, Linux, IBM AIX and Compaq Tru64.

The independent intelligent agents 1 provide secure and reliable communication mechanisms, advanced local filtering and corrective actions for proactive management. Flexible management concepts allow the definition of sophisticated management hierarchies, and a powerful role-based user concept supports scaling to any size. The invention is capable of managing mission-critical environments with tens of thousands of elements.

In a preferred implementation of the invention a common console 5 is provided which generates a consolidated view across all managed components, giving management staff immediate and consistent access to the status of mission-critical application services.

The invention is capable of collecting events from:
application and system logfiles 6
system messages 7
customer variables
MS Windows event log
MS Windows performance monitor
SNMP traps & variables 8
MPE/iX console messages
database status/error messages
hardware status/error messages The invention can perform the following operations with events:
event processing
event filtering, prioritizing, and grouping of messages
sophisticated event correlation The invention can as a result of the above operations:
buffer messages if the management system is down
forward messages to pre-defined systems
perform automatic actions The invention provides a consistent system- and fault-management process and workflow. It enables operators to use common techniques for all managed multi-vendor objects across the environment.

The preferred components of the invention are:

1. Intelligent Agents

Intelligent agents 1 can detect any failure and performance degradation of virtually any source on the managed system. They can monitor system and application logfiles 6, general system messages 7, SNMP traps and variables 8 (from networks 11), hardware components 12 (such as disks and CPUs) and customer variables from any application.

Events are converted into a standard internal format and forwarded 13 to the central management server 14.

Local buffering guarantees that all events are collected, even if the network connection to the central management server is down.

2. Central Management Server

Events are received from the intelligent agents 1. Although it will be appreciated that intelligent agents are not necessary and that events may come directly from the source.

Irrelevant and duplicated events may be suppressed (filtered out) if desired and stored in a central repository or deleted. Events can trigger pre-defined automatic actions, including the sending of messages to the user console. Processing also includes adding important or critical status information and grouping events into categories such as "security" or "OS." Using the built-in notification service, events can be automatically forwarded to other applications—for example, to flash a light or to activate a pager.

The invention provides that administrators may customise that way that events are processed and filtered by the central management server 14. Efficient event management helps to forward only relevant events to the user console 5:

Irrelevant and duplicated events can be filtered out, or stored in a central repository.

Optional message counters consolidate events. The user sees an event only once, including the number of occurrences instead of getting it multiple times.

Messages can easily be correlated. For example, a "database up" message can automatically acknowledge a "database down" message.

Custom attributes allow the extension of messages by adding any additional information, such as customer names or support levels, to the messages.

Messages can be grouped in any way, based on message attributes.

Service hours based on event attributes, such as time and managed node, guarantee that a user receives only messages related to services as defined.

Outage definitions based on event attributes, such as time and managed node, prevent the user from receiving hundreds of messages that result from a planned maintenance downtime of a system, database or application.

3. User Console

Event data (messages), received from the central management server 14, are presented to the user(s) in a consistent format, completely independent from the originating source:

Color coding (six different severity states) clearly indicates the severity of a failure or performance degradation.

The user can drill down to information about available actions and annotations attached to a message.

Event-specific instructions guide the user through the problem resolution process to quickly resolve a problem.

Using interactive troubleshooting and problem resolution, users can initiate pre defined actions with a single mouse-click to fix a problem or to gather additional data. All information resulting from the action execution is stored in a central database to automate the resolution of problems over time. Users also can own and acknowledge events or forward them on (escalate them) to other operators and applications.

In a preferred implementation of the invention a user interface is provided which combines the concepts of the invention with the familiar MICROSOFT™ WINDOWS™-type concepts to minimize training time and to reduce users' learning curve. It provides a single-pane-of-glass view across your environment, integrating information from numerous sources into a single operations centre.

Features of the user console 5 include:

The console provides all information at a glance. The core objects presented to the operator are managed nodes, available tools, message groups, and multiple message browsers.

An intuitive graphical user interface includes a menu bar, short-cut bar and context-sensitive menus for quick and easy problem analysis and resolution.

Customizable, reloadable views provide personal views for each operator.

Multiple event filter browsers help the operator to concentrate on emerging and business-critical problems first. Events can be filtered and sorted by using any of the event attributes, such as the timestamp, the severity and the logical group of a message.

Graphical chart summaries allow your operators to see the health of a system, database or application at a glance. They can be easily created using event filters.

Pre-integrated solutions, including HP OpenView Service Navigator, Network Node Manager, Performance Manager, Problem Diagnosis and Internet Services, allow for fast problem isolation and resolution.

The open interface allows any URL-based application to be launched from within the Java UI, using the context of an event (such as the node name).

Advanced Security

In an e-business environment a management solution needs to be security aware and not create any additional exposure through its operation. Providing secure communication mechanisms for managing business-critical and sensitive IT environments over potentially insecure network infrastructures is key to the success of an enterprise's security strategy. The invention comes with standard protection against passive attacks (eavesdropping) by securing all network traffic between the central management console and the distributed intelligent agents. The invention may provide an extended communication infrastructure to support authentication, data encryption and integrity of management data. The invention may provide data protection for the communication channels between the central management servers, distributed intelligent agents and the Java user interfaces.

Event Reduction and Consolidation

In addition to event filtering, the invention provides a method to solve the well known challenges of event reduction and consolidation across networks, systems, databases and applications. The significant reduction of the event load allows IT staff to manage a larger environment with the same resources. The invention provides correlation capabilities on supported intelligent agent platforms and on the central management server correlating data from any combination of event sources. The invention may provide for the development of correlation rules using an interactive graphical point-and-click user interface. Using a unique simulation mode, the correlation logic can be tested before it is deployed to the intelligent agents.

Preferably the invention is implemented as follows:

The central management server on any of:

HP-UX™ 11.0, 11.11 or Sun Solaris™ 2.7, 8; Sun Cluster™ 3.0

Oracle™ 8.1.7 Enterprise Edition (32-Bit, 64-Bit)

Oracle™ 9.0.1 Enterprise Edition (64-Bit)

The user console in Java on any of:

HP-UX™ 11.0, 11.11

Sun Solaris™ 7, 8

Microsoft Windows NT™, Windows 2000™, Windows 98™

JRE 1.3.1 or higher for running the UI as a Java application on MS Windows, JRE 1.3.2 on HP-UX™ and Sun Solaris™

Java plug-in 1.3.1 for running it in Internet Explorer™ 5.0, 5.5 and Netscape Navigator 4.7, 6.1 on Microsoft Windows NT™, Windows 2000™ and Windows 98™

The intelligent agents on any of:

HP-UX™ 10.20, 11.0, 11.11, 11.22

Sun SPARC Solaris™ 2.6, 7, 8, 9; Sun Cluster™ 3.0

Microsoft Windows NT™ 4.0, Windows 2000™ 5.0, Windows XP™ (32 bit)

IBM RS/600 AIX 4.3.1, 4.3.2, 4.3.3, 5.1

Compaq Tru64™ UNIX 4.0F, 4.0G, 5.0A, 5.1, 5.1A, 5.1B

Tru64 Cluster™ 5.1 A, 5.1 B

Red Hat™ Linux 6.2, 7.0, 7.1, 7.2, 7.3

SuSe™ Linux 6.2, 6.3, 6.4, 7.0, 7.1, 7.2, 7.3, 8.0

Turbo Linux 6.0J, 6.1J, 6.5J, 7.0J

Debian™ Linux 2.2r3, 2.2r4, 2.2r5

OS/390, OS/400

It will be appreciated by those skilled in the art that the central management server may be deployed on any computer system. It will be appreciated that the user console may be programmed in any language and deployed on any computer system. It will be further appreciated that the intelligent agents may be developed for any operating system.

Figure 2:
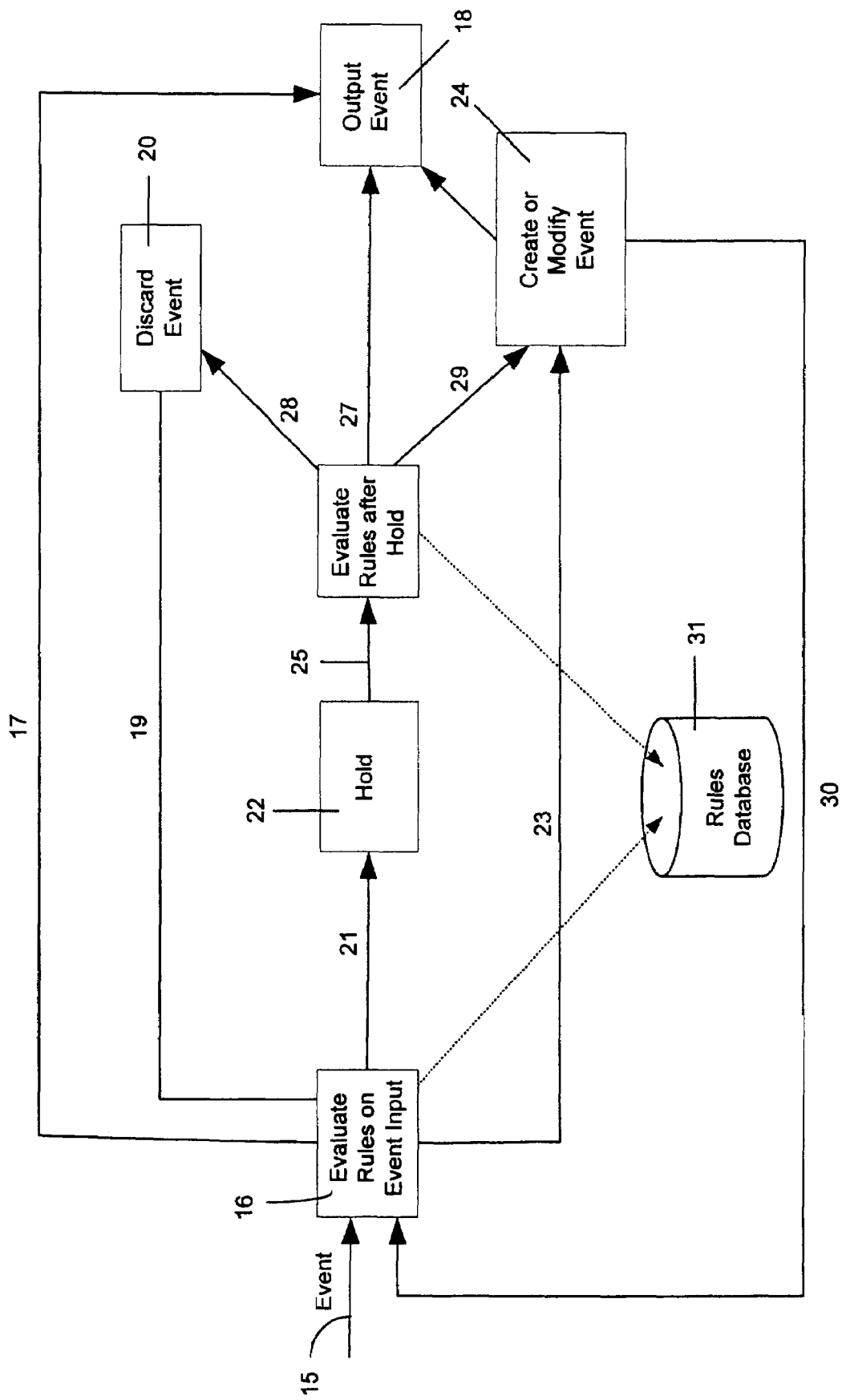
FIG. 2: illustrates a preferred embodiment of the engine within the central management server.

A detailed description of an implementation of the processing engine within the central management server will now be given with reference to FIG. 2.

Event Flow

An incoming event is inputted into a node 16 that evaluates the rules and determines what needs to be done with the event. There are four possibilities:

1) Take path 17 and output the event 18.
2) Take path 19 and discard the event 20.
3) Take path 21 and hold the event for a specified time 22.
4) Take path 23 and modify the event and/or create one or more new events 24.

The path to take depends on the semantics of the rule being applied to the event. The event may take more than one of the paths—for example the rule semantics may choose to send the event on all paths 17, 21, and 23.

If the rule determines that the event needs to be held then the event takes path 21. After the specified time expires the event flows out of the "HOLD" 22 and along path 25 to a node where the rules are re-evaluated to determine the fate of the event. There are three possibilities:

1) Path 27 and output the event 18.
2) Path 28 and discard the event 20.
3) Path 29 and modify the event and/or create one or more new events 24.

As before, the event may take more than one path—the path(s) taken depends on the semantics of the rule.

Created/Modifed events can flow back 30 into the system (i.e the new events can also take part in correlation logic, if so desired).

In a preferred implementation of the invention, if the same event takes part in multiple roles the sum of the decisions of the individual rules is applied. An event is output if and only if no rule discards it or holds it.

Rules Database

The rules database 31 is a repository of rules.

Figure 3:
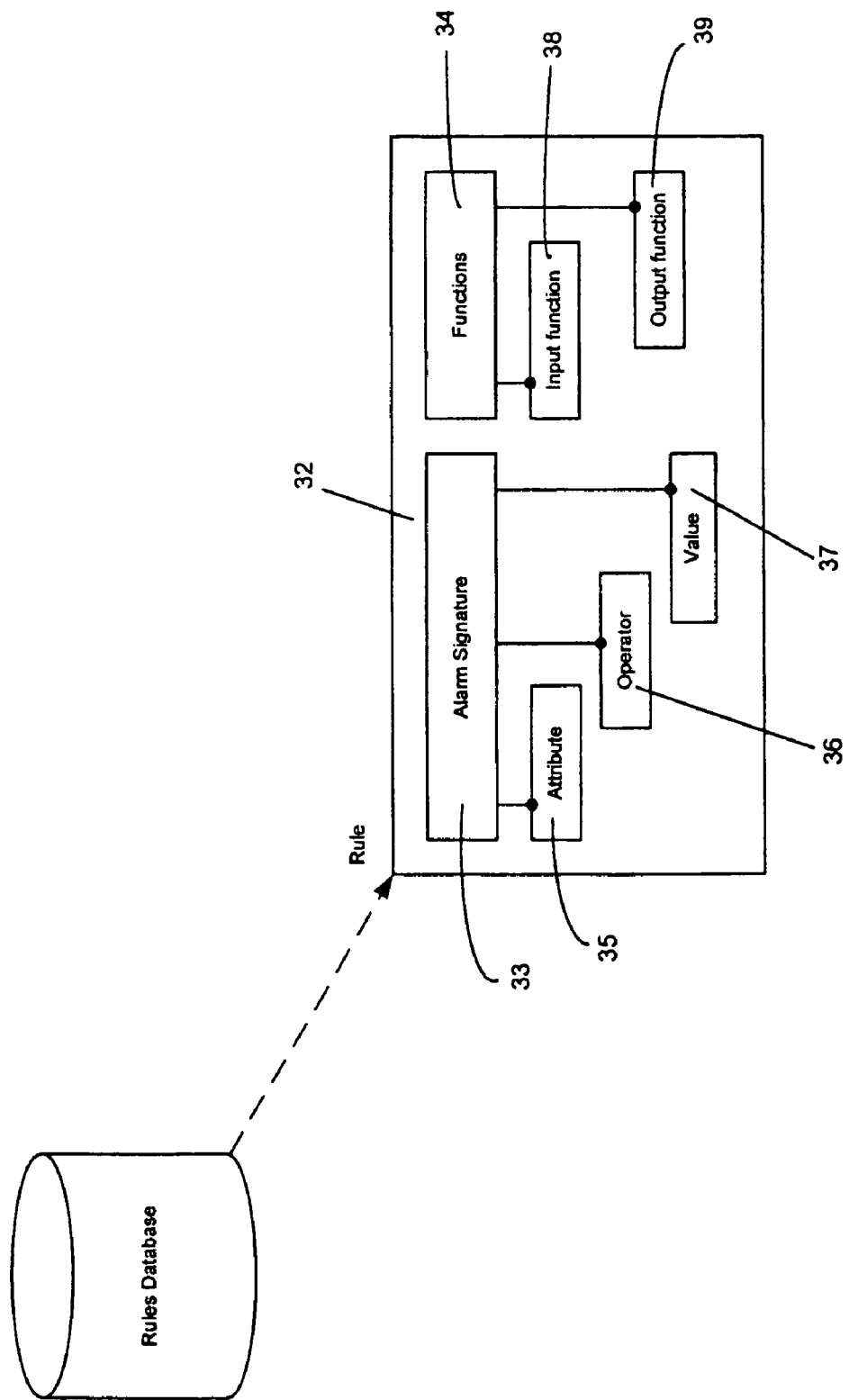
FIG. 3: illustrates the structure of a rule used within the engine.

A preferred structure of a rule will now be described with reference to FIG. 3.

Preferably each rule 32 is a tuple of two—(alarm signature 33, functions 34). Alarm signature is an array of conditions and is a 3-tuple of the format (attribute 35, operator 36, value 37), while functions is a tuple of 2—(input function 38, output function 39).

The idea of the alarm signature is this—if the incoming event matches all the conditions specified by the alarm signature then the rule is applied to the incoming event (Note: An event can be operated upon by multiple rules if the alarm signatures match).

When an event meets the alarm signature criteria specified then the input function is invoked and the event is passed to the input function. The return value of the input function determines which of the paths the event will take (paths in 17, 19, 21 and 23 in FIG. 2). If the input function specifies that the event needs to be held, the duration is also specified. After the event is held for the specified period, the output function is invoked. The return value of the output function determines the path that the event will take (paths 27, 28, and 29 in FIG. 2).

Pseudo code for the engine is provided below:

```
Correlation_Engine
    if the incoming event is identified by a rule
    then
        call the input function for the event
        Switch on the return value of the called input
        function:
            PASS : send the event out
            ALTER/CREATE: Create a new event as per user
            specification
            HOLD: Hold the event for the specified period
            after the hold period time is over call the output
            function
            Switch on the return value of the called output
            function:
                PASS : send the event out
                ALTER/CREATE: Create a new event as per user
                specification
                DISCARD: discard the event
            end Switch
            DISCARD: discard the event
        end Switch
    else
```

-continued
```
            do nothing
        endif
    end
```

EXAMPLES TO ILLUSTRATE THE INVENTION

The following examples illustrate the engine used within the central management server.

Example 1

Figure 4:
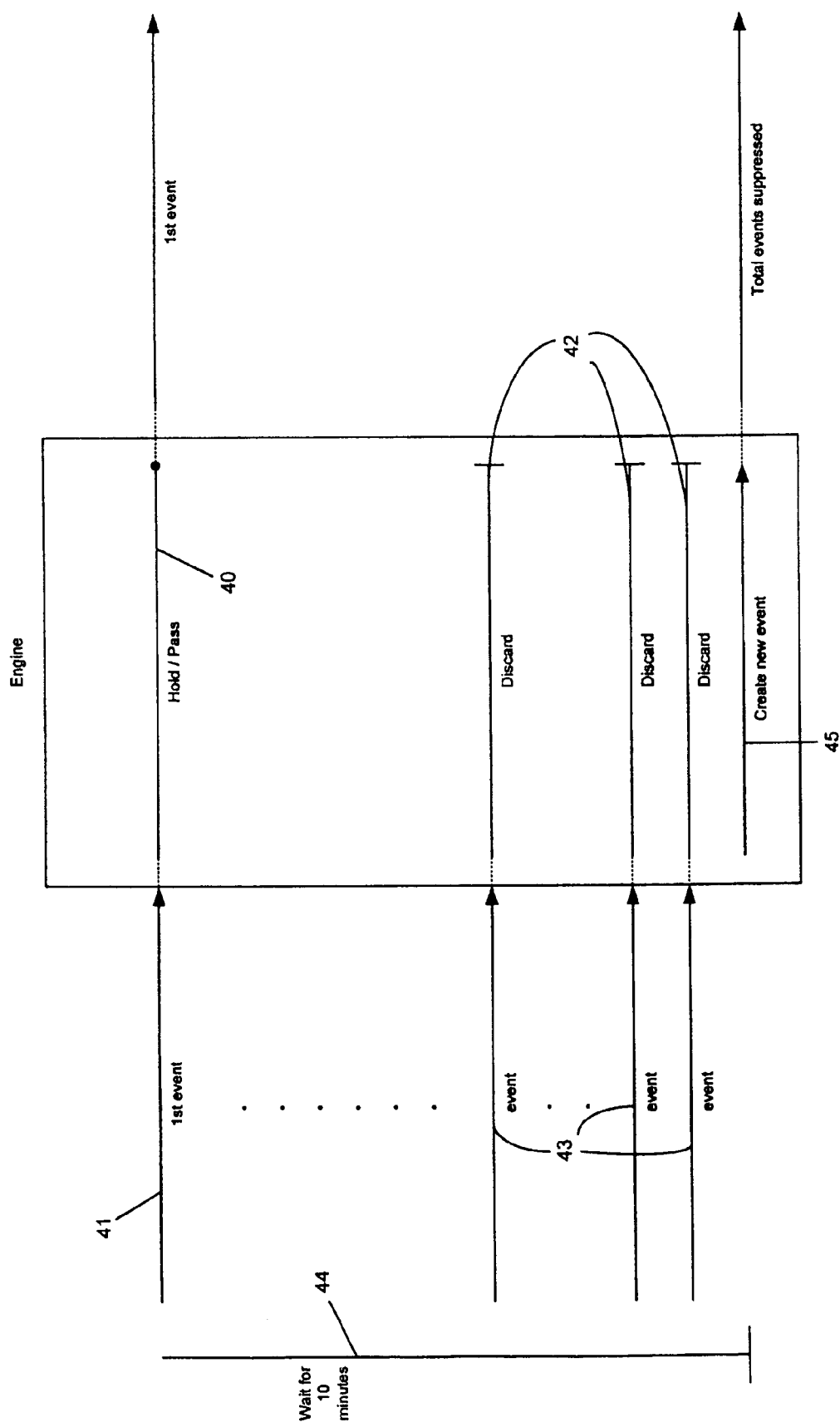
FIG. 4: illustrates example 1.

Referring to FIG. 4, a first example will be described.

In this example, a "repeated correlation" rule is required that forwards 40 (outputs) the 1st event 41 of a certain type and suppresses 42 (discards) any other events 43 of the same type within a ten minute window 44. At the end of the ten minute window a new event 45 is created that indicates the number of events suppressed.

In the example the event is recognized by the following attributes:
1) Enterprise=1.2.3.4, and
2) Specific-trap=10 or 20, and
3) Generic-trap=1

In the example the SNMP-TrapPDU format is used to describe the event. However, the invention itself is agnostic to the format. The invention may be configured so that incoming events in a particular format may be interpreted by the engine itself. Alternatively, a multitude of intelligent agents may received events in a multitude of formats and send the events in a standard format to the engine. For example, other formats that might be used include: SNMP, CMIP, X733 and OpC (the internal format for HEWLETT PACKARD™—OpenView events).

To implement the rule the following steps are taken:

1) A "repeated correlation" rule is created and in the alarm signature section of the rule the following is entered:
[("enterprise", "equals", 1.2.3.4), ("specific-trap", "is in the list", [10,20]), ("generic-trap", "equals", 1)]

The above is an array of tuples that describes the events for which the "repeated correlation" rule is to be applied to.

2) The functions section of the rule is specified as:
("Repeated_Event_Input", "Repeated_Event_Output")

The above specifies the names of functions that need to be revoked when the event enters and when the event finishes waiting.

It will be appreciated that the functions can be implemented in any computing language.

The pseudo-code for the functions is given below:

```
RepeatedEvent_Input_Function
    if 1st event
    then
        return PASS and HOLD for 10 minutes
        //tell the engine to output the event and also hold the
        //event for 10 minutes
    else //This is not 1st event
        increment number of events discarded
        return DISCARD
        //Instruct the engine to discard the event
    endif
end
RepeatedEvent_Output_Function
    specify what the new event should look like (including the
```

-continued
```
    number of discarded events)
    return CREATE
end
```

Example 2

Figure 5:
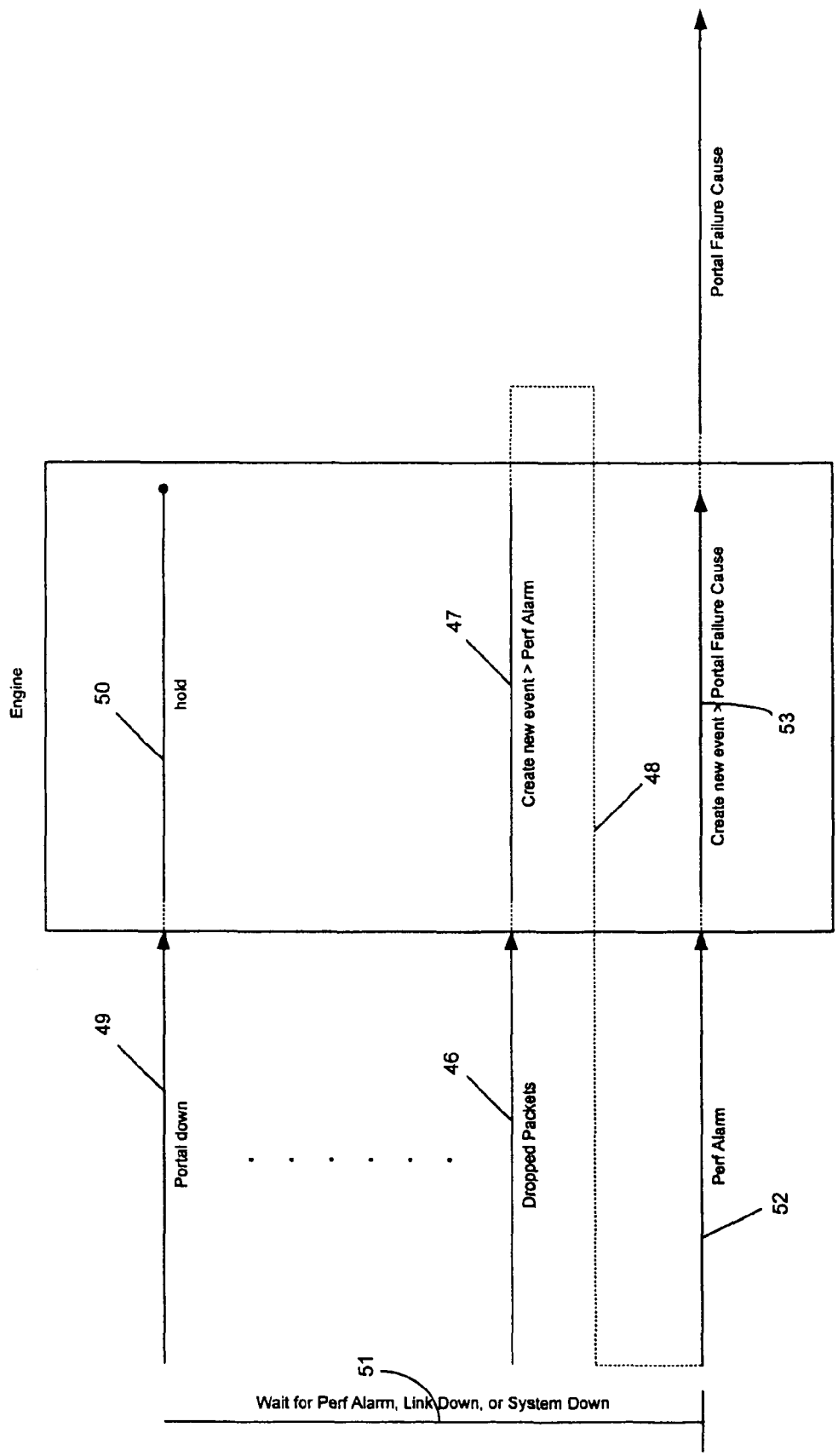
FIG. 5: illustrates example 2.

Referring to FIG. 5, a second example will be described.

In this example, a portal service depends on the system being up, performance being good, and the network links staying up. The network generates a number of performance events. What is required is a system to correlate the failure of the portal service with performance of the network.

A first rule is configured to receive the following network events: "bandwidth utilisation", "dropped packets" 46, "swap full", and "proc table full". This rule is configured to create 47 a new event when it receives any of those network events called "perf alarm". "Perf alarm" has an attribute called rootcause which is set to the type of network event received (i.e. "bandwidth utilisation", "dropped packets", "swap full", or "proc table full"). This new event is specified within the rule to be fed back 48 into the engine.

The alarm signature for the first rule is:
("event type", "is in the list", ["bandwidth utilisation", "dropped packets", "swap full", "proc table full"])

A second rule is configured to receive a "portal down" event 49 from the portal service. This rule is configured to hold 50 the "portal down" event for a specified time and wait 51 for one of the following events: "perf alarm" 52, "link down", or "system down".

If the "perf alarm" event is received then the real root cause of the portal failing is the rootcause specified within the "perf alarm" event. In this example, a new event—"portal failure cause"—is created 53. An attribute within the "portal failure cause" event is set to the rootcause attribute of the "perf alarm" event received.

The alarm signature for the second rule is:
("event type", "is in the list", ["portal down", "perf alarm", "link down", "system down"])

Pseudo-code to implement the input function for the first rule is provided (this rule does not have an output function as the event is not held):

```
NetworkPerformance_Input_Function
    specify new event PERF_ALARM with attribute rootcause equal
to event type
    return CREATE
end
```

Pseudo-code to implement the input and output functions for the second rule is provided:

```
PortalFailure_Input_Function
    if event is of type PORTAL_DOWN
    then
        store eventid
        return HOLD
    else
        if store has an event of type PORTAL_DOWN
        then
            if event is of type PERF_ALARM
            then
```

-continued

```
            set portal_failure_cause as rootcause of
            PERF_ALARM
            return DISCARD
         else
            set port_failure_cause as event type
            return DISCARD
         end if
      else
         return PASS
      endif
   endif
end
PortalFailure_Output_Function
   if portal_failure_cause exists
   then
      specify new event PORTAL_FAILURE_BECAUSE with attribute
      rootcause equal to portal_failure_cause
      return CREATE
   else
      return PASS
   endif
end
```

Example 3

Figure 6:
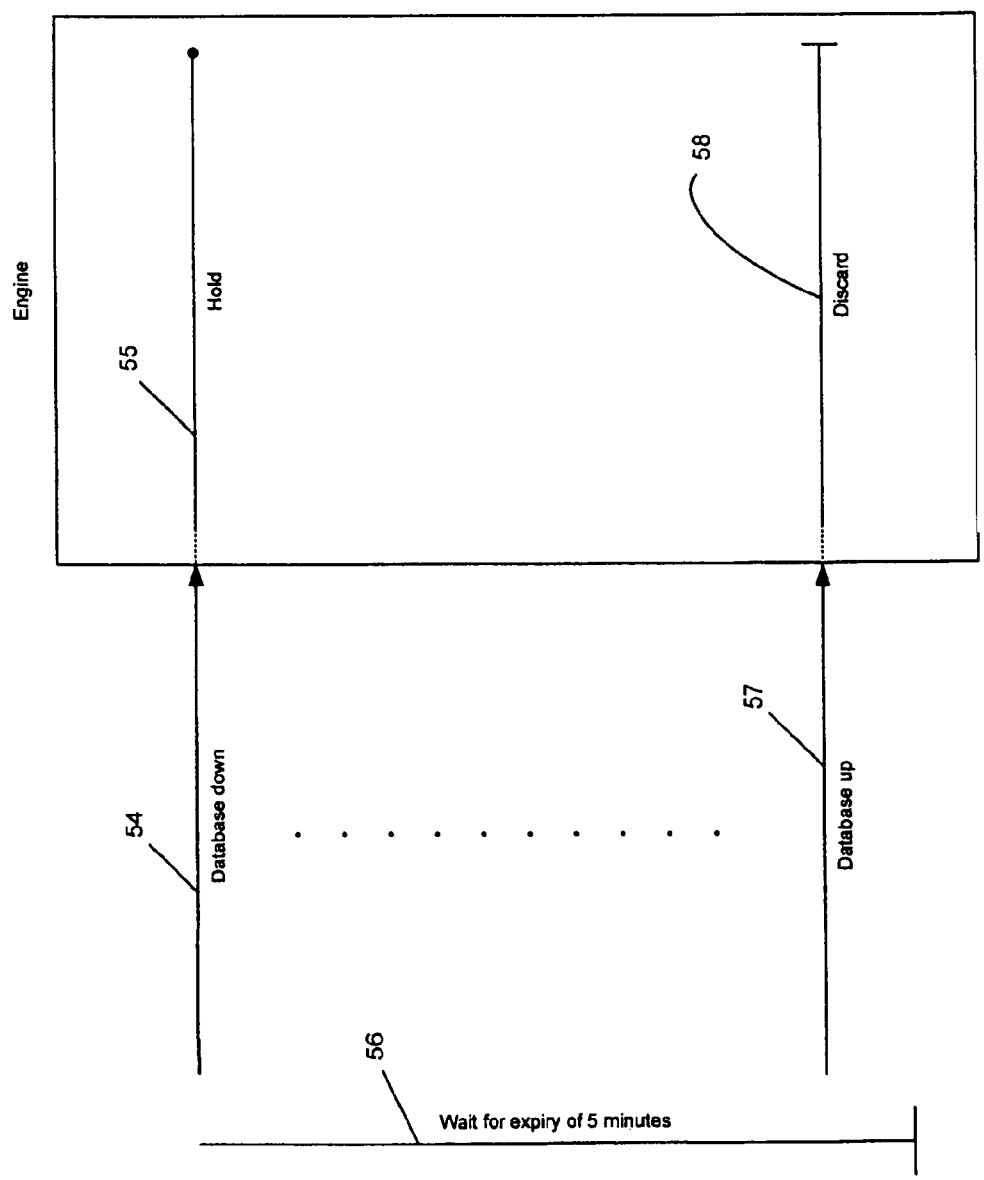
FIG. 6: illustrates example 3.

Referring to FIG. 6, a third example will now be described.

In this example, a database system occasionally crashes but comes back on-line after a couple of minutes. The database manager only needs to be alerted to the crash if the database does not automatically restart within five minutes. Therefore a system is desired to correlate a "database down" event with a "database up" event within five minutes.

A rule is configured to receive a "database down" event 54 and to hold 55 that event for five minutes 56. The rule is further configured to wait for a "database up" event 57 within that time window 56. If a "database up" event is not received in the time window then the "database down" is sent on (output). If the "database up" event is received, then both events are correlated 58 (discarded).

The alarm signature for the rule is:
("event type", "is in the list", ["database down", "database up"])

Pseudo-code to implement the input and output functions of the rule is provided below:

```
         Transient_Input_Function
            if event is of type DB DOWN
            then
               store eventid
               return HOLD
            else
               /* this is an UP event */
               if store has an event of type DB DOWN
               then
                  mark down events for discard
                  return DISCARD
               else
                  return PASS
               endif
            endif
         end
         Transient_Output_Function
            if event has been marked for discard
            then
               return DISCARD
            else
               return PASS
            endif
         end
```

Example 4

Figure 7:
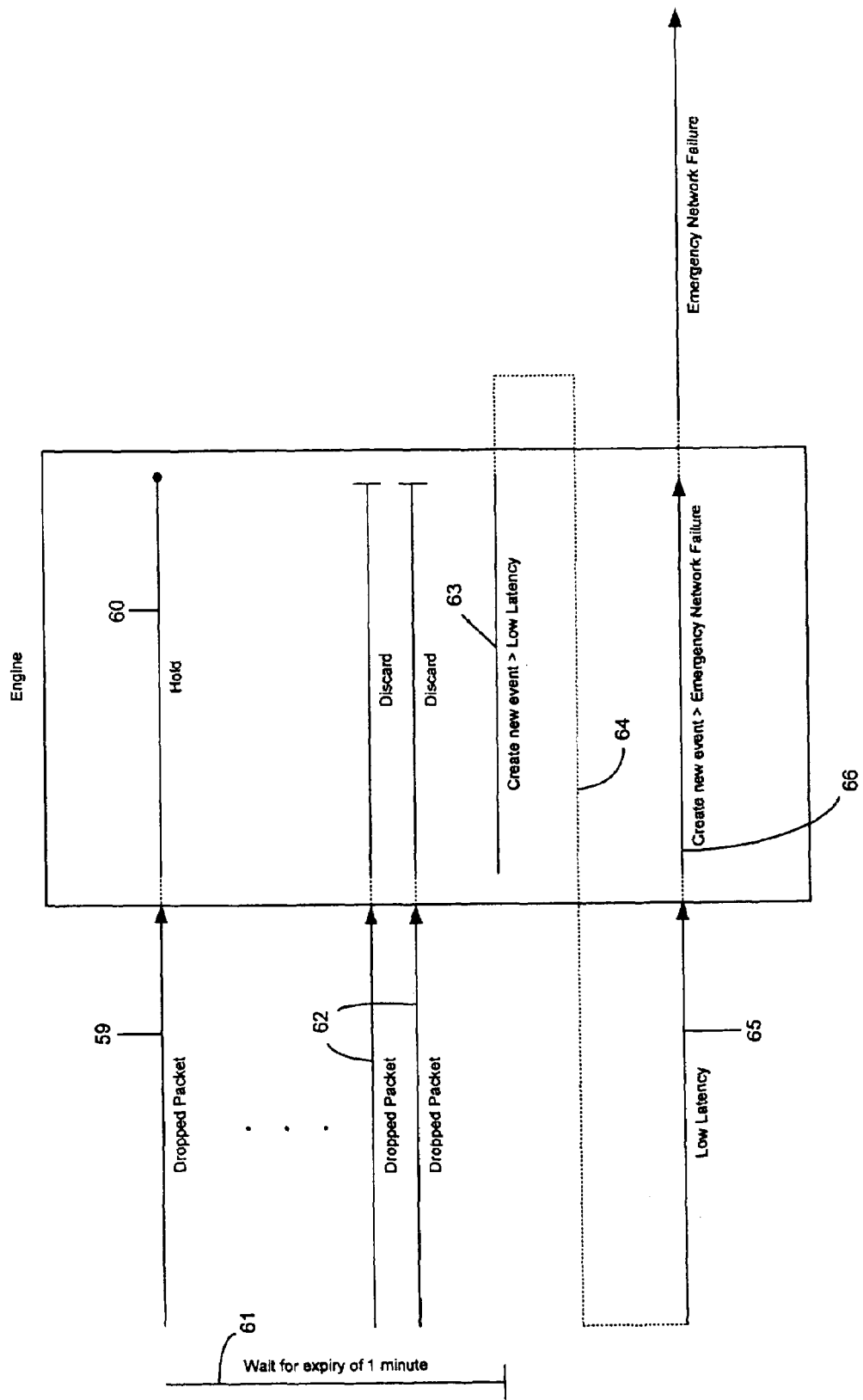
FIG. 7: illustrates example 4.

Referring to FIG. 7, a fourth example will now be described.

In this example, packets are occasionally dropped over the network. This can lead to low latency which may be the cause of problems for other applications. Therefore a system is desired to correlate multiple instances of dropped packets to conclude whether a network has low latency.

A first rule is configured to receive a "dropped packet" event 59 and to hold 60 that event for one minute 61. The rule is further configured to wait for additional "dropped packet" events 62 within that time window. If a certain number of additional events are received the rule is configured to generate a new event 63 "low latency" with an attribute set to the number of dropped packets received, and to feed that event back 64 into the engine.

The alarm signature for the first rule is:
("event type", "equals", "dropped packet")

A second rule is configured to receive the "low latency" event 65. The rule may be configured to discard that event if for example the number of dropped packets received is within specified thresholds, or to pass on the event to a user console, or to hold the event and wait for other events which may explain the dropped packets, or to generate a new event 66 if the number of dropped packets exceeds a certain threshold.

The alarm signature for the second rule is:
("event type", "equals", "low latency")

Pseudo-code to implement the input and output functions of the first rule is provided below:

```
         Packets_Input_Function
            if 1st event
            then
               return HOLD for 1 minutes
            else //This is not 1st DROPPED PACKET event received in the
               //last minute
               increment number of dropped packets received
               return DISCARD
               //Instruct the engine to discard the event
            endif
         end
         Packets_Output_Function
            specify creation of new event LOW LATENCY with attribute
            dropped packets set to the number of dropped packets received
            return CREATE
         end
```

Pseudo-code to implement an example of an input function for the second rule is given:

```
         Latency_Input_Function
            if attribute dropped packets < 100
            then
               return DISCARD
            else
               if attribute dropped packets > 1000
               then
                  specify creation of new event EMERGENCY NETWORK
                  FAILURE
                  return CREATE
```

-continued

```
        endif
    else
        return PASS
    endif
end
```

Example 5

Figure 8:
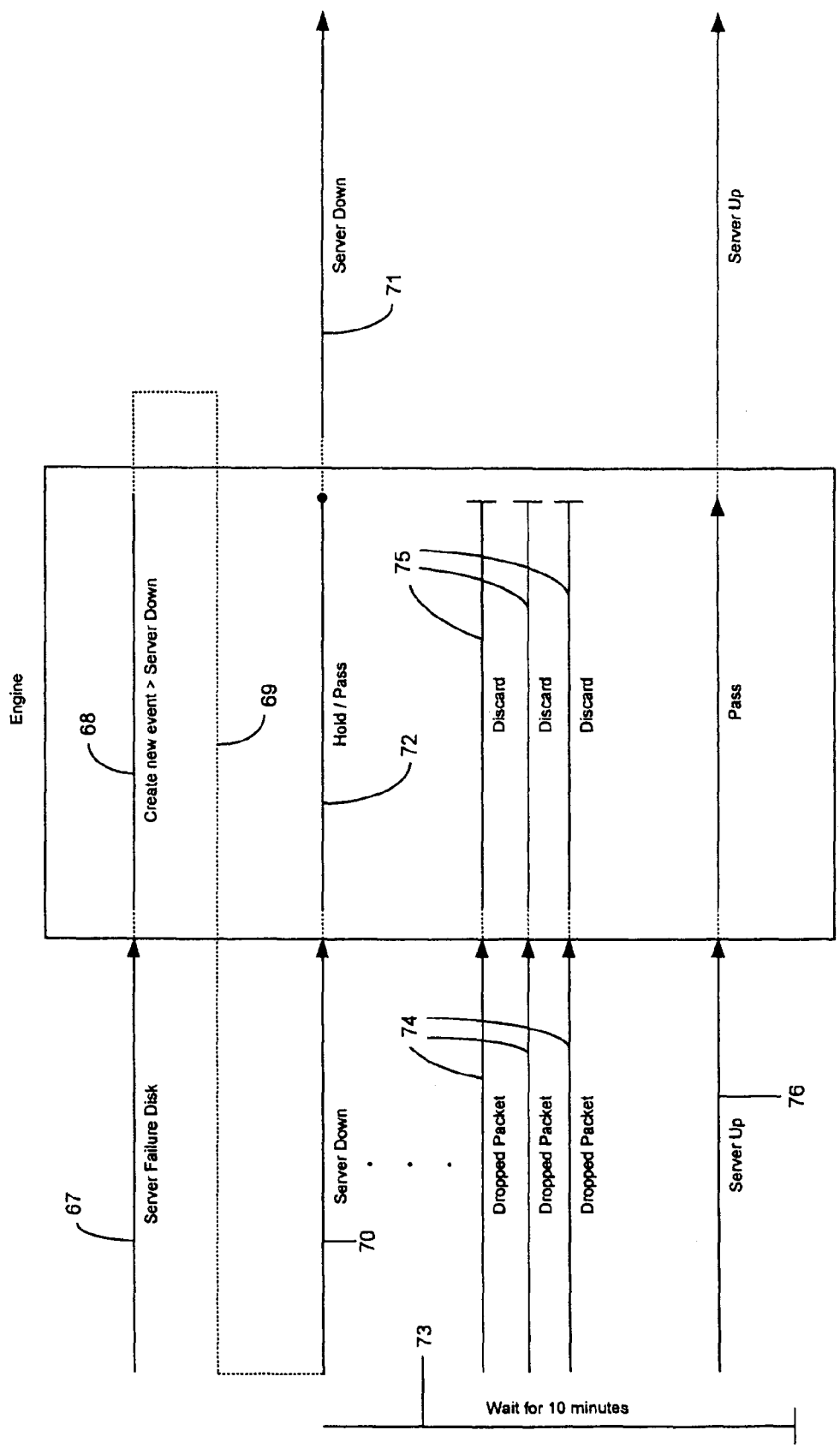
FIG. 8: illustrates example 5.

Referring to FIG. 8, a fifth example will now be described.

In this example, there are many different ways that a server can fail. When a server fails the server manager will generally need to be notified. Applications that access the server may send out server failure messages. Once the server manager has been notified of the server going down, however, there is no need for them to receive further messages. Therefore a system is required to monitor for all types of server failure and send a message on the server manager and to block subsequent failures regarding the server.

A first rule is configured to receive "server disk failure" 67, "server processor failure", and "server memory failure" events. The rule is further configured when it receives any of the previous events to generate 68 a single "server down" event and to feed that back 69 into the engine.

The alarm signature for the first rule is:
("event type", "is in the list", ["server disk failure", "server processor failure", "server memory failure"])

A second rule is configured to receive the "server down" event 70 to output 71 the event and to hold 72 the event for sixty minutes 73. The rule is further configured to receive within that time window 73 any "cannot connect" events 74 from applications that are failing to connect to the server, and discard them 75. The rule is further configured to receive a "server up" event 76. If such an event is not received at the end of the time window the "server down" event is fed back into the engine.

The alarm signature for the second rule is:
("event type", "is in the list", ["server down", "cannot connect", "server up"])

Pseudo-code to implement the input and output functions of the first rule is provided below:

```
ServerFailure_Input_Function
    specify creation of new event SERVER DOWN
    return CREATE
end
```

Pseudo-code to implement the input and output functions of the second rule is provided below:

```
BlockFailMsgs_Input_Function
    if event is of type SERVER DOWN
    then
        store eventid
        return PASS and HOLD for 10 minutes
        //tell the engine to output the event and also hold the
        //event for 60 minutes
    else
        if store has SERVER DOWN
        then
            if event is of type SERVER UP
            then
```

```
                store eventide
                return PASS
                //The server is back up, pass this message
                //on
            else //The event is cannot connect
                return DISCARD
                //Instruct the engine to discard the event
            endif
        else
            return PASS
        endif
    endif
end
RepeatedEvent_Output_Function
    if eventid not equals SERVER UP
    then
        specify new event SERVER DOWN
        return CREATE
        //If the server is not back up then feed back server
        //down event to the engine
    else
        return DISCARD
        //Server is back up
    endif
end
```

An advantage of the invention is that implementation of any kind of correlation can be done within the same engine. The output is dependant on individual rules therefore a problem can be broken up into smaller and simpler rules. The feedback mechanism allows hierarchal building of correlation models. This means that the invention is simpler to implement and maintain over event correlation/management system.

Additional advantages of the invention include:
event filtering, consolidation and correlation;
fast problem isolation and automatic correction; and
a central operator console While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method of managing different types of events in a distributed computing system, having an event engine, including the steps of:
   i. providing one or more intelligent agents for receiving a first event and converting the first event into a standard format, and inputting the first event into the engine;
   ii. the engine extracting a rule to be applied to the first event from a rules database wherein identification information within the rule identifies the first event;
   iii. the engine holding the first event for an expiration of a specified interval;
   iv. before the expiration of the specified interval, receiving at least one subsequent event from an intelligent agent, converting the subsequent event into a standard format and inputting the subsequent event into the engine;

v. the engine identifying the subsequent event using identification information within the rule;
vi. waiting for identical subsequent events;
vii. if, during the specified interval, a predetermined number of identical subsequent events are received, the engine creating and outputting a new event with an attribute that indicates the number of identical subsequent events that were received;
viii. inputting the new event into the engine;
ix. the engine extracting a second rule to be applied to the new event from a rules database wherein identification information within the second rule identifies the new event;
x. determining whether the number of identical subsequent events exceeds a threshold;
xi creating a threshold event indicating whether the number of identical subsequent events exceeds the threshold; and
xii outputting the threshold event to a user, wherein the threshold event is output to the user in a format independent of a source of the event comprising:
a severity code;
predefined actions available to the user; and
event-specific instructions for the user, wherein information resulting from execution of the predefined actions or event-specific instructions is stored in a central database to automate the execution of the predefined actions or event-specific instructions upon recurrence of the threshold event.

2. A method as claimed in claim 1 wherein the first event and the subsequent event originate from any of a set of a network, an application or an operating system residing on the distributed computing system, and hardware.

3. A method as claimed in claim 1, wherein the identification information includes:
i. an attribute;
ii. an operator; and
iii. a value.

4. A method as claimed in claim 3 wherein the specified interval is time.

5. A method of managing different types of events in a distributed computing system, having an event engine, including the steps of:
i. providing one or more intelligent agents configured for receiving at least one event specifying a type of server failure and converting the event into a standard format, and inputting the event into the engine;
ii. the engine extracting a rule to be applied to the event from a rules database wherein identification information within the rule identifies the event;
iii. the engine creating and outputting a new event indicating a server failure has occurred;
iv. inputting the new event into the engine;
v. the engine extracting a second rule to be applied to the new event from the rules database wherein identification information within the second rule identifies the new event;
vi. the engine holding the new event for the expiration of a specified interval;
vii. before the expiration of the specified interval, receiving at least one subsequent event from an intelligent agent, converting the subsequent event into a standard format and inputting the subsequent event into the engine;
viii. the engine identifying the subsequent event using identification information within the second rule; and
ix. wherein, if the subsequent event indicates a server restoration has occurred, outputting the subsequent event to a user, or if the subsequent event indicates a type of server failure, the subsequent event is discarded, and after the expiration of the specified interval the new event indicating a server failure has occurred is output to the user, wherein the new event indicating a server failure has occurred is output to the user in a format independent of a source of the event comprising:
a severity code;
predefined actions available to the user; and
event-specific instructions for the user, wherein information resulting from execution of the predefined actions or event-specific instructions is stored in a central database to automate the execution of the predefined actions or event-specific instructions upon recurrence of an event indicating a server failure has occurred.

6. A method as claimed in claim 5 wherein the event and the subsequent event originate from any of a set of a network, an application, an operating system, and hardware.

7. A method as claimed in claim 6, wherein the identification information includes:
i an attribute;
ii. an operator; and
iii. a value.

8. A method as claimed in claim 7 wherein the specified interval is time.

9. A method as claimed in claim 8 wherein the subsequent event is received by a user console.

10. A method of managing different types of events in a distributed computing system using a management server, having an event engine, including the steps of:
i. providing one or more intelligent agents for receiving at least one event related to the performance of a network and converting the event into a standard format, and inputting the event into the engine;
ii. the engine extracting a first rule to be applied to the event from a rules database wherein identification information within the first rule identifies the event;
iii. the engine creating and outputting a new event having an attribute set to the type of event related to the performance of the network received;
iv. inputting the new event into the engine;
v. receiving at least one subsequent event indicating a portal service failure event from an intelligent agent, converting the subsequent event into a standard format and inputting the subsequent event into the engine;
vi. the engine extracting a second rule to be applied to the subsequent event from a rules database wherein identification information within the second rule identifies the subsequent event;
vii. the engine holding the subsequent event for an expiration of a specified interval;
viii. before the expiration of the specified interval, receiving the new event; and
ix. the engine creating and outputting an event identifying the cause of the portal service failure, having an attribute set to the attribute of the new event that is set to the type of event related to the performance of the network, wherein the new event identifying the cause of the portal service failure is output to the user in a format independent of a source of the event comprising:
a severity code;
predefined actions available to the user; and event-specific instructions for the user, wherein information resulting from execution of the predefined actions or event-specific instructions is stored in a central database to automate the execution of the predefined actions or event-specific instructions upon recurrence of the event identifying the cause of the portal service failure.

11. A method as claimed in claim 10 wherein the event and the new event originate from any of the set of a network, an application, an operating system, and hardware.

12. A method as claimed in claim 11, wherein the identification information includes:
 i. an attribute;
 ii. an operator; and
 iii. a value.

13. A method as claimed in claim 12 wherein the specified interval is time.

14. A method a claimed in claim 13 wherein the new event is received by a user console.

15. A method of managing different types of events in a distributed computing system including the steps of:
 i. receiving a first event indicating a database failure and converting the first event into a standard format;
 ii. extracting a rule to be applied to the first event from a rules database wherein identification information within the rule identifies the first event;
 iii. the engine holding the first event for an expiration of a specified interval;
 iv. if a subsequent event indicating the database is restored is received before expiration of the specified interval, discarding the first event and the subsequent event; and
 v. if the subsequent event indicating the database is restored is not received before expiration of the specified interval, outputting the first event indicating database failure to a use, wherein the new event indicating database failure is output to the user in a format independent of a source of the event comprising:
  a severity code;
  predefined actions available to the user; and
  event-specific instructions for the user, wherein information resulting from execution of the predefined actions or event-specific instructions is stored in a central database to automate the execution of the predefined actions or event-specific instructions upon recurrence of an event indicating database failure.

16. A method of managing different types of events in a distributed computing system including the steps of:
 i. processing a first event by:
 ii. receiving the first event and converting the first event into standard format;
 iii. extracting one or more rules which match the event from a rules database;
 iv. holding the first event for a specified period of time;
 v. receiving at least one subsequent event within the specified period of time;
 vi. if the subsequent event is the same type of event as the first event, discarding the subsequent event;
 vii. at the end of the specified period of time, creating a new event that indicates the number of subsequent events that were discarded during the specified period of time; and
 viii. outputting the first event and the new event to a user, wherein the first event and the new event are output to the user in a format independent of a source of the first event and the new event comprising:
  a severity code;
  predefined actions available to the user; and
  event-specific instructions for the user, wherein information resulting from execution of the predefined actions or event-specific instructions is stored in a central database to automate the execution of the predefined actions or event-specific instructions upon recurrence of the first event and the new event.

17. Storage media containing software for executing the method of claim 15.

18. A computer implemented system for managing different types of events in a distributed computing system, embodied in a computer readable medium, including:
 i. computer code for providing a plurality of event agents adapted to receive data from a source, to create an event from the data, convert the event into a standard format and to transmit the event to a central event system; and
 ii. computer code for providing a central event system including:
  a) a rules database adapted to store a plurality of rules, each rule including:
   I. identification information specifying to which events the rule relates; and
   II. an action for filtering, correlating or consolidating one or more received events wherein the action is one of outputting the event, discarding the event, holding the event, or creating a new event;
   wherein, where the action is holding the event the rule further includes:
   I. a condition; and
   II. a further action wherein the further action is one of outputting the event, discarding the event, holding the event, creating a new event, or creating a new event and transmitting the new event back into the processing engine; and
  b) a processing engine adapted to receive events, to extract rules from the rules database, to identify which rules apply to the events using the identification information within the rule, to perform the action specified within the applicable rules, to perform the further action specified within the applicable rules when the corresponding condition is satisfied and to output the events to a user, wherein the event is output to the user in a format independent of a source of the event comprising:
   a severity code;
   predefined actions available to the user; and
   event-specific instructions for the user, wherein information resulting from execution of the predefined actions or event-specific instructions is stored in a central database to automate the execution of the predefined actions or event-specific instructions upon recurrence of the event.

19. A computer implemented system as claimed in claim 18 including one or more user consoles adapted to receive one or more of the events outputted by the central event system.

20. A computer implemented system as claimed in claim 19 wherein the source is any one of a set of a database, an application, an operating system, and hardware.

21. A computer implemented system as claimed in claim 20 wherein the identification information includes:
 i. an attribute;
 ii. an operator; and
 iii. a value.

* * * * *

UNITED STATES PATENT AND TRADEMARK OFFICE
CERTIFICATE OF CORRECTION

PATENT NO. : 7,289,988 B2
APPLICATION NO. : 10/614060
DATED : October 30, 2007
INVENTOR(S) : Anish Pulikottil Joseph It is certified that error appears in the above-identified patent and that said Letters Patent is hereby corrected as shown below:

In column 15, line 16, in Claim 1, delete "xi creating" and insert -- xi. creating --, therefor.

In column 15, line 19, in Claim 1, delete "xii outputting" and insert -- xii. outputting --, therefor.

In column 16, line 25, in Claim 7, delete "i an" and insert -- i. an --, therefor.

In column 17, line 18, in Claim 14, after "method" delete "a" and insert -- as --, therefor.

Signed and Sealed this

Twenty-second Day of September, 2009

David J. Kappos
*Director of the United States Patent and Trademark Office*